United States Patent [19]
Khanna et al.

[11] Patent Number: 5,870,256
[45] Date of Patent: Feb. 9, 1999

[54] TANDEM INERTIA LOCK DISK DRIVE

[75] Inventors: Vijayeshwar Das Khanna, Ossining; Suresh Kumar, Croton-on-Hudson; Sri Muthuthamby Sri-Jayantha, Ossining, all of N.Y.

[73] Assignee: International Business Machines Corporation, Armonk, N.Y.

[21] Appl. No.: 927,755

[22] Filed: Sep. 11, 1997

[51] Int. Cl.⁶ .................................................. G11B 5/54
[52] U.S. Cl. ................................................... 360/105
[58] Field of Search ............................................. 360/105

[56] References Cited

U.S. PATENT DOCUMENTS

| | | |
|---|---|---|
| 5,296,986 | 3/1994 | Morehouse et al. ................. 360/106 |
| 5,404,257 | 4/1995 | Alt ........................................ 360/105 |
| 5,528,437 | 6/1996 | Mastache .............................. 360/105 |
| 5,668,683 | 9/1997 | Stone ..................................... 360/105 |

*Primary Examiner*—A. J. Heinz
*Attorney, Agent, or Firm*—Francis L. Conte

[57] ABSTRACT

A disk drive includes a data storage disk rotatably mounted in a housing. An access arm is rotatably mounted in the housing and has an access head at a distal end thereof for travel over the disk to write data thereto and read data therefrom. A pair of counter imbalanced inertia locks are operatively joined between the housing and the access arm for inertia latching the access arm upon shock loading of the access arm to prevent movement thereof over the disk irrespective of combinations of linear and angular shock loading.

10 Claims, 3 Drawing Sheets

TANDEM INERTIA LOCK DISK DRIVE

BACKGROUND OF THE INVENTION

The present invention relates generally to computer hard disk drives, and, more specifically, to inertia locks therein.

A typical computer hard disk drive includes a rotating data storage disk which is accessed by a pivoting access arm which includes a read/write access head for magnetically writing data to the disk and reading data therefrom. The access arm is typically elongate and suspends the access head on a slider to float atop the data disk as it travels in operation to access different portions of the data zone on the disk.

The access head is disposed at a distal end of the arm, with the arm having a central pivot about which it rotates over the disk, using a conventional actuator such as a voice coil motor operatively joined to an opposite proximal end of the access arm. The typical voice coil motor includes suitable windings on the arm proximal end which define a rotor, with a pair of permanent magnets being suitably mounted to the disk drive housing sandwiching therebetween the access arm proximal end to define the voice coil motor. The proximal end of the access arm is selectively moved during operation between the permanent magnets for in turn traversing the access head at the opposite distal end of the access arm radially over the data storage disk to read and write data.

When the disk drive is off, the access head is typically parked on a load and unload (L/UL) ramp located at the outer diameter of the disk to prevent inadvertent contact between the access head and the disk surface which could corrupt or damage the surface and data thereon. In an alternate embodiment, the access arm may be parked near the inner diameter of the storage disk at a conventional contact start and stop (CSS) zone for the same safety consideration.

In either design, the disk drive is subject to inadvertent shock loading such as, for example, which might occur if the disk drive is dropped to the floor. Such a shock loading may effect both linear and angular shock loads which can cause the access arm to pivot over the data zone leading to undesirable damage thereof.

In order to lock the access arm in its parked position during non-operating conditions, various types of conventional latches may be used. Some latches rely on magnetic or voice-coil principles for locking the access arm in a stationary, parked position. However, these types of latches are relatively complex and expensive.

A relatively simple and inexpensive latch is conventionally known as an inertial latch which relies on its own inertia to engage a cooperating catch on the access arm during suitable shock loading of the disk drive to prevent flotation of the access arm over the data zone. A typical inertia latch is an elongate member having a central pivot, with a hook at a distal end thereof on one side of the pivot, and a counter balance at a proximal end thereof on an opposite side of the pivot. Typically, a small spring biases the latch away from the catch during normal operation, with a suitable level of angular shock automatically overcoming the restraining spring force for allowing the latch to engage the access arm and prevent its rotation during a shock event.

Although the inertia latch is relatively simple in construction, it requires precise manufacturing tolerances and mass balance. This ensures that its center of gravity is aligned with the axis of the pivot so that only angular shock loads are effective to cause relative rotation between the latch and the access arm to engage the catch and thereby lock rotation of the access arm. Since the individual inertia latches are subject to typical manufacturing tolerances during fabrication, each latch has a statistical amount of imbalance wherein its center of gravity is not perfectly aligned with the center of the latch pivot. The practical significance of even a small amount of latch imbalance is that the latch may be ineffective for locking the access arm in a very small region of the shock envelope depending on the combination of linear and angular shock loads.

Under most combinations of linear and angular shock loading, the latch will engage the catch and lock the access arm from pivoting. However, under the right combination of linear and angular shock, the effect of the off-set center of gravity due to manufacturing tolerances will prevent the latch from engaging the catch which will lead to unrestrained travel of the access arm over the storage disk and possible damage thereto. This renders the typical inertia latch statistically uncertain.

Accordingly, an improved inertia latch is desired for eliminating uncertainty of latch effectiveness due to typical manufacturing tolerances.

SUMMARY OF THE INVENTION

A disk drive includes a data storage disk rotatably mounted in a housing. An access arm is rotatably mounted in the housing and has an access head at a distal end thereof for travel over the disk to write data thereto and read data therefrom. A pair of counter imbalanced inertia locks are operatively joined between the housing and the access arm for inertia latching the access arm upon shock loading of the access arm to prevent movement thereof over the disk irrespective of combinations of linear and angular shock loading.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
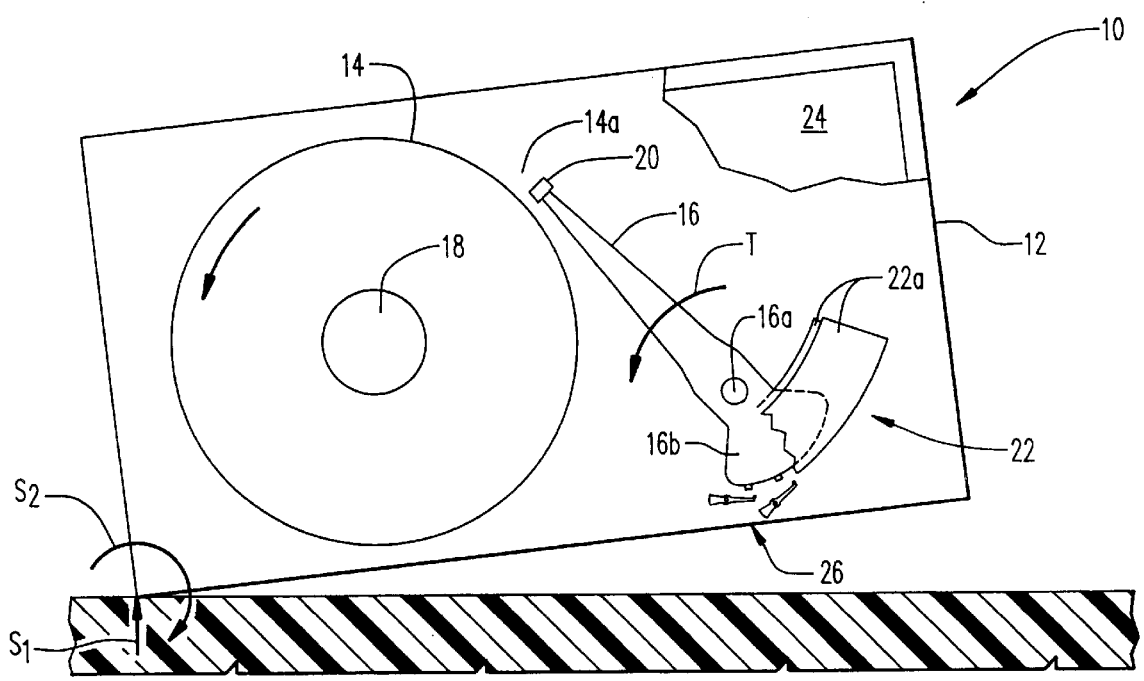
FIG. 1 is a schematic representation of an exemplary hard disk drive being dropped atop a surface for effecting shock loading thereto, with a pair of inertia locks being effective for locking an access arm from traveling over a data storage disk in accordance with an exemplary embodiment of the present invention.

Illustrated in FIG. 1 is an exemplary hard disk drive 10 which includes a suitable housing 12 in which are mounted a magnetic data storage disk 14 and an access arm 16. A suitable electrical motor 18 includes a spindle joined to the disk 14 for rotating the disk 14 during operation. The access arm 16 includes a central pivot 16a which suitably rotatably mounts the arm in the housing 12. The access arm also includes a read and write access head 20 at a distal end thereof for travel over the disk 14 to magnetically write data thereto and read data therefrom.

A proximal end of the access arm 16 opposite to the access head 20 cooperates with a conventional voice coil motor 22 to selectively rotate the access arm 16 radially across the disk 14 for accessing any of the various data zones thereof. The disk drive 10 further includes a controller 24 having suitable electronic components for controlling all operations of the disk drive 10 for reading and writing data in magnetic form. The hard disk drive 10 as thusly described may have any conventional configuration and operation for reading and writing data.

In accordance with the present invention, the disk drive 10 further includes a pair of counter imbalanced inertia locks 26 operatively joined between the housing 12 and access arm 16 for inertia latching the access arm 16 only upon lateral shock loading of the access arm to prevent movement thereof over the disk 14 and preventing damage thereto during a shock event such as that illustrated in FIG. 1.

For example, the disk drive 10 may be inadvertently dropped onto a table 28, or the floor, impacting a corner of the disk drive 12 for example. The disk drive 10 is therefore subject to shock loading having a linear component $S_1$ and an angular component $S_2$, Since the access arm 16 is conventionally pivotally mounted with minimum restraining friction force, its own inertia effects a relative counterclockwise torque T which tends to drive the access arm 16 radially inwardly over the disk 14 from its initial position near the outer diameter. The inertia locks 26 themselves are also subject to inertial torques in the plane of the disk 14 and access arm 16 which are effectively used for simultaneously locking the access arm 16 against travel radially inwardly over the disk 14.

Figure 2:
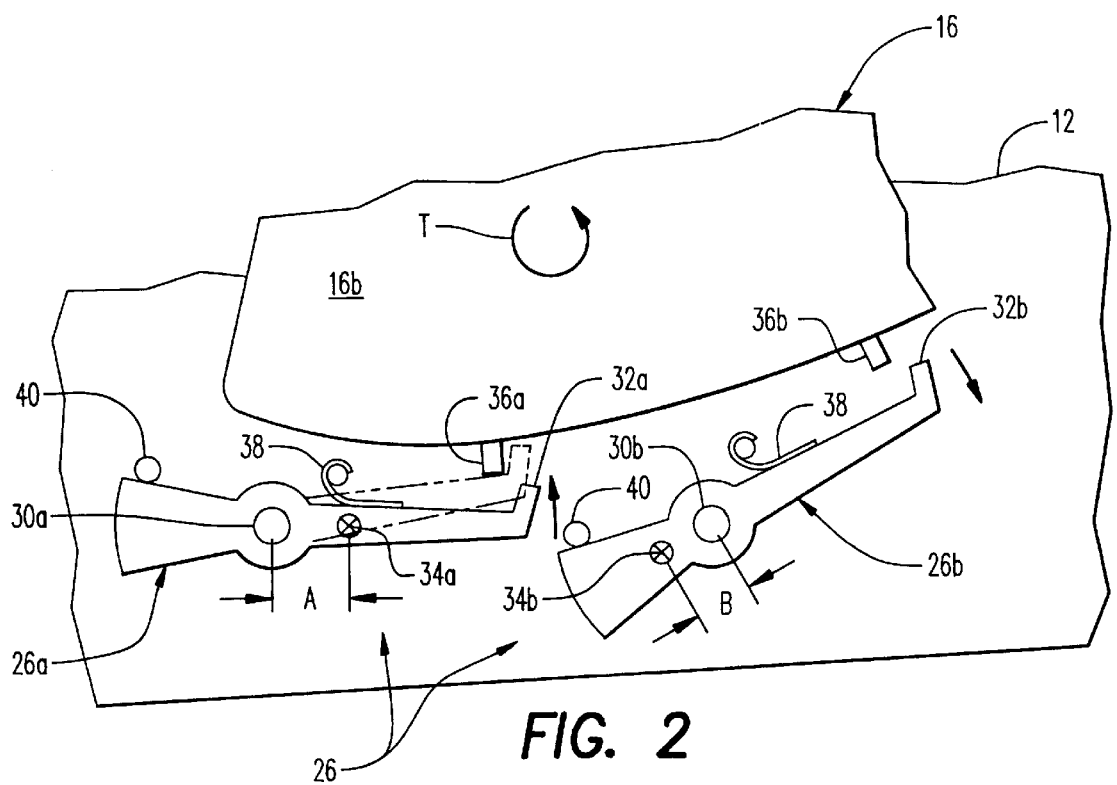
FIG. 2 is an enlarged plan view of the tandem inertia locks illustrated in FIG. 1 cooperating with a proximal end of the access arm in accordance with an exemplary embodiment of the present invention.

The inertia locks 26 are illustrated in more particularity in an exemplary embodiment in FIG. 2. The inertia lock pair includes an elongate first inertia latch 26a and a similarly configured elongate second inertia latch 26b. The first latch 26a includes a central first pivot 30a rotatably mounting the first latch 26a to the housing 12. The second latch 26b similarly includes a central second pivot 30b for rotatably mounting the second latch 26b to the housing 12. The pivots 30a,b may take any conventional form including a simple aperture in the respective latches through which a cooperating pin from the housing 12 extends, or suitable bushings may also be used around the pins. In this way, relatively low friction pivot mounting of the latches 26a,b may be effected in any conventional manner.

The first latch 26a further includes a first hook 32a at its distal end spaced from the first pivot 30a, and similarly, the second latch 26b includes a second hook 32b at its distal end spaced from the second pivot 30b.

The first latch 26a has a center of gravity 34a disposed on one side of the first pivot 30a closer to the first hook 32a, or between the first pivot 30a and the first hook 32a. The second latch 36b has a center of gravity 34b disposed on an opposite side of the second pivot 30b away from the second hook 32b. The first center of gravity 34a is therefore disposed on the inboard or near side of the first pivot 30a near to the first hook 32a; and the second center of gravity 34b is disposed on the outboard or far side of the second pivot 30b on the opposite side of the second pivot 30b farther away from the second hook 32b.

In accordance with the present invention, the first and second latches 26a,b are deliberately counter imbalanced to act in tandem so that at least one of the latches 26a,b automatically engages the access arm 16 when the other latch fails irrespective of the combination of linear and angular shock. Whereas conventional inertia latches are balanced as accurately as possible to align the centers of gravity thereof with their respective pivots, the tandem latches 26a,b are deliberately individually imbalanced offsetting the centers of gravity on opposite sides of the respective pivots to cover the entire in-plane shock envelope which would otherwise drive the access arm 16 over the disk 14 during shock loading. Manufacturing tolerances therefore do not have the same precision requirements found in conventional balanced latches since a predetermined amount of imbalance is initially designed in, with the magnitude thereof being secondary in importance to the mere existence thereof on opposite sides of the respective pivots 30a,b.

In the exemplary embodiment illustrated in FIG. 2, the latches 26a,b are laterally spaced apart from each other at the respective first and second pivots 30a,b, and cooperate with a pair of respective first and second catches 36a,b fixedly disposed on the access arm 16. In the exemplary embodiment illustrated in FIGS. 1 and 2, the access arm 16 has a proximal end 16b disposed on an opposite side of its pivot 16a relative to the access head 20. The arm proximal end 16b defines a conventional rotor which cooperates with a pair of permanent magnets 22a. The arm proximal end 16b and the permanent magnets 22a define the voice coil motor 22 which is conventional in structure and operation for selectively rotating the access arm 16 during operation.

The catches 36a,b illustrated in FIG. 2 may take any suitable form and may be mounted at any suitable location around the perimeter of the access arm 16 for restraining its rotation during the shock event. In the exemplary embodiment illustrated in FIG. 2, the catches 36a,b take the exemplary form of projecting tabs extending outwardly from the distal end 16b of the access arm 16 in the vicinity of the voice coil motor 22 adjacent to the latches 26a,b mounted thereby. The latches 26a,b are aligned in the same plane as the first and second hooks 32a,b for engaging at least one of the hooks to inertia lock the access arm 16 under the shock loading.

As shown in FIG. 2, the first latch 26a has a total mass acting at the first center of gravity 34a thereof, with the center of gravity 34a being disposed at a first moment arm A from the center of the first pivot 30a, with the product therebetween defining a first moment. Similarly, the second latch 26b has a total mass acting at its center of gravity 34b which is disposed at a second moment arm B from the center of the second pivot 30b, with the product therebetween defining a second moment.

In the preferred embodiment illustrated in FIG. 2, the first and second moments effected by the off-set centers of gravity 34a,b are substantially equal in magnitude, but opposite in effect or direction to effect counter imbalance between the two latches 26a,b. In this way, any shock loading which would tend to prevent engagement of one of the latches with the access arm 16 will necessarily engage the other latch with the access arm 16 preventing its rotation during the shock event. In the exemplary embodiment illustrated in FIG. 2, the combination of linear and angular shocks acting on the access arm 16 also acts on both latches 26a,b causing the first latch 26a to engage the first catch 36a as illustrated in phantom line, while preventing engagement of the second latch 26b.

The individual inertial locks 26 themselves may take any conventional form, but modified in accordance with the present invention to deliberately introduce counter imbalance in a cooperating pair thereof instead of using a single balanced conventional latch. Whereas the single conventional latch is subject to manufacturing tolerances which may slightly offset the center gravity thereof rendering it ineffective for latching the latching the access arm 16 throughout the entire shock envelope, the use of the tandem counter imbalanced latches 26a,b in accordance with the present invention ensures complete coverage of the entire shock envelope irrespective of the actual amount of center of gravity offset from the respective pivots 30a,b.

As in conventional inertial latches, the improved inertial locks 26 further include suitable means in the form of a cantilever leaf spring 38 suitably pin mounted at one end to the housing 12, with an opposite distal end thereof biasing the respective first and second latches 26a,b away from the respective catches 36a,b during absence of the shock loading. Corresponding stop pins 40 extend from the housing 12 to engage the respective proximal ends of the latches 26a,b for controlling the range of rotation of the latches 26a,b which are biased thereagainst by the springs 38.

Although a pair of the inertial locks 36 are required for the present invention for covering the entire shock envelope for the access arm 16, they are relatively simple in construction and operation for maintaining low cost of the disk drive 10. Since the individual latches 26a,b do not require accurate balancing as required for conventional latches, the manufacturing tolerances may be increased for further reducing cost of fabrication. The offset centers of gravity 34a,b may be effected using any suitable manner, for example by providing more structure and therefore more mass on the respective sides of the pivots 30a,b, with the actual amount of the offset being less significant in magnitude. Although the tandem latches 26a,b cooperate to ensure that a shock loading failing to engage one of the latches will necessarily engage the other latch to prevent rotation of the access arm 16, in the remainder of the shock envelope both latches 26a,b will simultaneously engage their respective catches 36a,b for providing redundant locking of the access arm 16 during most shock loads.

Figure 3:
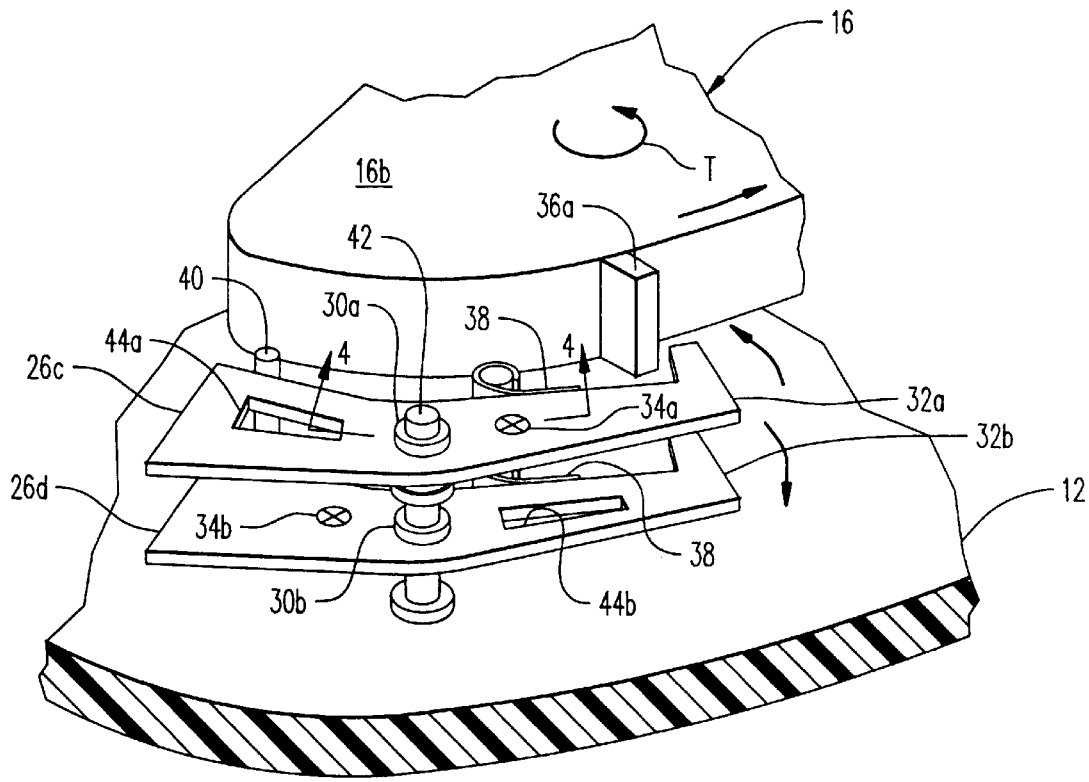
FIG. 3 is an isometric view of a pair of inertia locks cooperating with the access arm in accordance with an alternate embodiment of the present invention.
Figure 4:
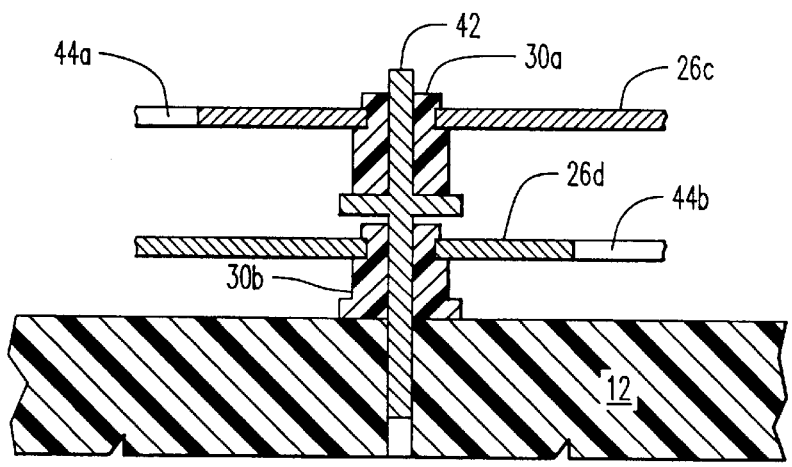
FIG. 4 is an elevational sectional view through a portion of the inertia locks illustrated in FIG. 3 and taken along line 4—4.

Illustrated in FIGS. 3 and 4 is an alternate embodiment of another pair of latches designated third and fourth latches 26c and 26d. In this embodiment, the latches 26c,d are coaxially aligned on a common support pin 42 extending upwardly from the housing 12 about which the first and second pivots 30a,b are defined. In this embodiment, the support pin 42 is a simple cylindrical rod with an integral center disk for separately mounting the third latch 26c atop the fourth latch 26d for independent rotation thereof with relatively low friction. The first and second pivots 30a,b are in the form of suitable plastic bushings integrally formed with the respective latches 26c,d.

As shown in FIG. 3, the tandem latches 26c,d preferably cooperate with a common, single catch 36a in the form of an outwardly projecting tab on the access arm 16. Separate catches could also be used if desired.

The latches 26c,d are preferably thin sheet plates of metal or plastic, for example, which may be substantially identical in configuration except for respective differently located first and second cut-outs or apertures 44a,b for effecting the required counter-imbalance. The latches 26c,d have respective proximal ends which engage the common stop pin 40 which are biased thereagainst by respective biasing springs 38 which act on the distal ends of the respective latches adjacent to the respective hooks 32a,b, on respective sides of the first and second pivots 30a,b.

Since the latches 26c,d are preferably substantially identical in configuration and mass, the first and second cut-out 44a,b are disposed in the respective proximal and distal ends of the first and second latches to correspondingly locate the respective centers of gravity 34a,b on opposite sides of the common support pin 42 and respective pivots 30a,b. This further decreases cost of manufacture by using otherwise common latches 26c,d with differently located cut-outs for effecting the required counter-imbalance.

Figure 5:
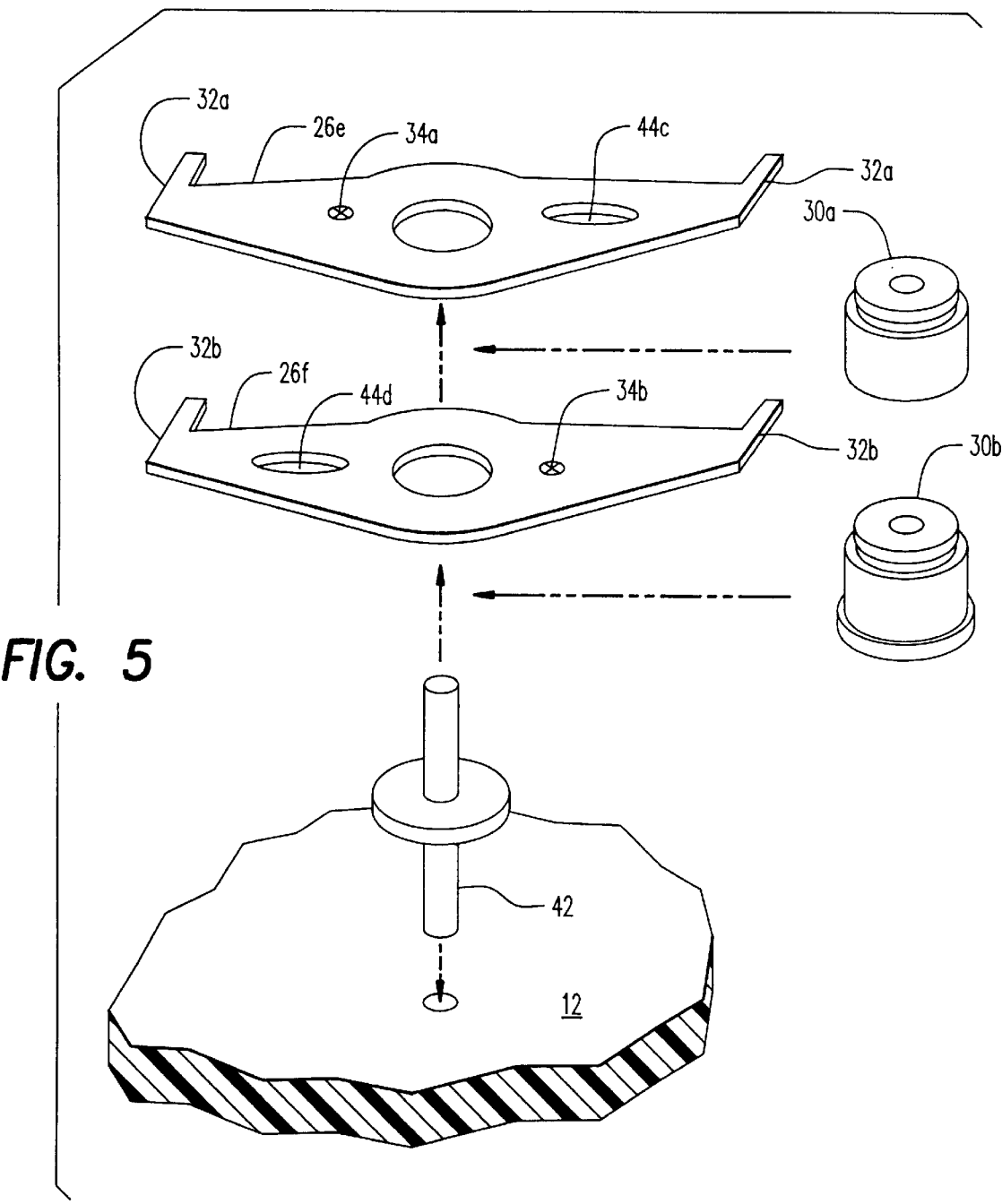
FIG. 5 is an exploded view of a pair of inertia locks in accordance with another embodiment of the present invention.

In FIG. 3, the latches 26c,d are substantially identical except for the placement of the respective cut-outs 34a,b. In FIG. 5, an alternate embodiment of the present invention is illustrated with a pair of substantially identical and symmetrical latches 26e,f which may be simply mounted to the housing 12 in opposite configurations to provide the oppositely disposed centers of gravity 34a,b on the first and second pivots 30a,b. The upper latch 26e illustrated in FIG. 5 has a profile symmetrical about its center aperture in which a first bushing pivot 30a is mounted with an identical pair of first hooks 32a being disposed at opposite ends thereof. A suitable cut-out 44c is disposed between the center aperture and one of the opposite first hooks 32a to locate the respective center of gravity 34a on the opposite side of the center aperture.

The identical symmetrical latch 32a may simply be turned over in a mirror image to create the corresponding latch 26f with identical hooks 32b and an identical cut-out 44d mounted oppositely to the cut-out 44c in the upper latch. The upper and lower latches 26e,f may be mounted to the housing 12 like those shown in FIGS. 3 and 4 for operation.

The various latches disclosed above may take various configurations for effecting predetermined counter imbalance in the tandem pair of latches for cooperating with the access arm 16 and preventing its rotation during shock loading using simply the inertia of the individual latches. In the exemplary embodiment illustrated in FIG. 1, the disk 14 includes a conventional load and unload (L/UL) ramp or zone 14a adjacent the outer diameter thereof for parking the access head 20 when the disk drive 10 is powered off, for example. The inertial locks 26 are therefore configured to inertia lock the access arm 16 against radially inward, counterclockwise, travel over the disk 14 under the shock loading to prevent damage to the recording surface of the disk 14.

In an alternate embodiment (not shown), the disk 14 may include a conventional contact start-stop (CSS) zone at its inner diameter at which the access head 20 may be parked when the disk is powered off. In this configuration, the inertia locks would be oppositely oriented to prevent clockwise rotation of the access arm 16 radially outwardly over the disk 14 during the shock loading.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A disk drive comprising:

a housing;

a data storage disk rotatably mounted in said housing;

an access arm rotatably mounted in said housing, and having an access head at a distal end thereof for travel over said disk to write data thereto and read data therefrom; and a pair of counter imbalanced inertia locks operatively joined between said housing and access arm for inertia latching said access arm upon shock loading of said access arm to prevent movement thereof over said disk.

2. A disk drive according to claim 1 wherein said inertia lock pair comprise:

a first latch having a central first pivot rotatably mounting said first latch to said housing, a first hook spaced from said first pivot, and a center of gravity disposed on one side of said first pivot closer to said first hook;

a second latch having a central second pivot rotatably mounting said second latch to said housing, a second hook spaced from said second pivot, and a center of gravity disposed on an opposite side of said second pivot away from said second hook; and at least one catch fixedly joined to said access arm in alignment with said first and second hooks for engaging at least one of said hooks to inertia lock said access arm under said shock loading.

3. A disk drive according to claim 2 wherein:

said first latch has a mass at said center of gravity thereof disposed at a first moment arm from said first pivot, with a product therebetween defining a first moment;

said second latch has a mass at said center of gravity thereof disposed at a second moment arm from said second pivot, with a product therebetween defining a second moment; and said first and second moments are substantially equal in magnitude.

4. A disk drive according to claim 3 further comprising means for biasing said first and second latches away from said catch during absence of said shock loading.

5. A disk drive according to claim 4 wherein said first and second latches are laterally spaced apart at said first and second pivots, and cooperate with a pair of said catches disposed on said access arm.

6. A disk drive according to claim 4 wherein said first and second latches are coaxially aligned at said first and second pivots, and cooperate with a common catch on said access arm.

7. A disk drive according to claim 4 wherein said first and second latches are substantially identical, but mounted oppositely to said housing to provide said oppositely disposed centers of gravity on said first and second pivots.

8. A disk drive according to claim 4 wherein said first and second latches are sheet plates having differently located apertures for effecting said counter imbalance.

9. A disk drive according to claim 8 wherein:

said first and second latches include respective proximal ends on one side of said respective first and second pivots, with said first and second hooks defining distal ends on opposite sides thereof; and said first and second apertures are disposed in said proximal and distal ends, respectively, of said first and second latches.

10. A disk drive according to claim 4 wherein:

said disk includes a load and unload zone adjacent an outer diameter thereof for parking said access head; and said inertial lock pair are configured to inertia lock said access arm against radially inward travel over said disk under said shock loading.

* * * * *